United States Patent [19]
Crayton

[11] 4,012,907
[45] Mar. 22, 1977

[54] EXHAUST APPARATUS

[75] Inventor: William James Crayton, Portrena, Scotland

[73] Assignee: Thomas Buchanan, Canada; a part interest

[22] Filed: Sept. 24, 1975

[21] Appl. No.: 616,367

[30] Foreign Application Priority Data

June 9, 1975 Canada .............................. 228897

[52] U.S. Cl. .................................. 60/315; 60/317; 60/902; 416/223 R

[51] Int. Cl.[2] ..................... F02B 35/00; F01N 3/02

[58] Field of Search ................... 60/315, 317, 902; 416/223, 228, 239, 226

[56] References Cited

UNITED STATES PATENTS

| 1,286,365 | 12/1918 | Loomis | 60/902 |
| 1,506,937 | 9/1924 | Miller | 416/223 |
| 3,279,684 | 10/1966 | Waters | 416/223 |
| 3,538,685 | 11/1970 | Bremen | 60/315 |

FOREIGN PATENTS OR APPLICATIONS

| 115,470 | 12/1929 | Germany | 416/228 |
| 1,351,115 | 4/1974 | United Kingdom | 60/317 |

Primary Examiner—Douglas Hart
Attorney, Agent, or Firm—Browdy & Neimark

[57] ABSTRACT

A device for securement to or incorporating into the exhaust assembly of an internal combustion engine to improve efficiency thereof is disclosed. The device comprises a generally tubular housing open at both ends to enable passage of exhaust gases and a flow of air therethrough, and an axle coaxially positioned within the housing on a laterally extending support member, and a hub rotatably mounted on the axle, and two identical and opposed radially extending blades secured to the hub, the blades being obliquely angled with respect to the longitudinal axis of the hub, at least the forward edge of each blade extending inwardly providing inwardly pointing projections. In preferred construction, the inwardly pointing projection is formed between the forward edge of the blade and a forward inner edge of the blade, the said edges defining therebetween an angle of about 66° – 67°. In a further embodiment, at least the leading portion of each blade lies in a plane at an angle of about 72° with respect to the longitudinal axis of the hub.

6 Claims, 4 Drawing Figures

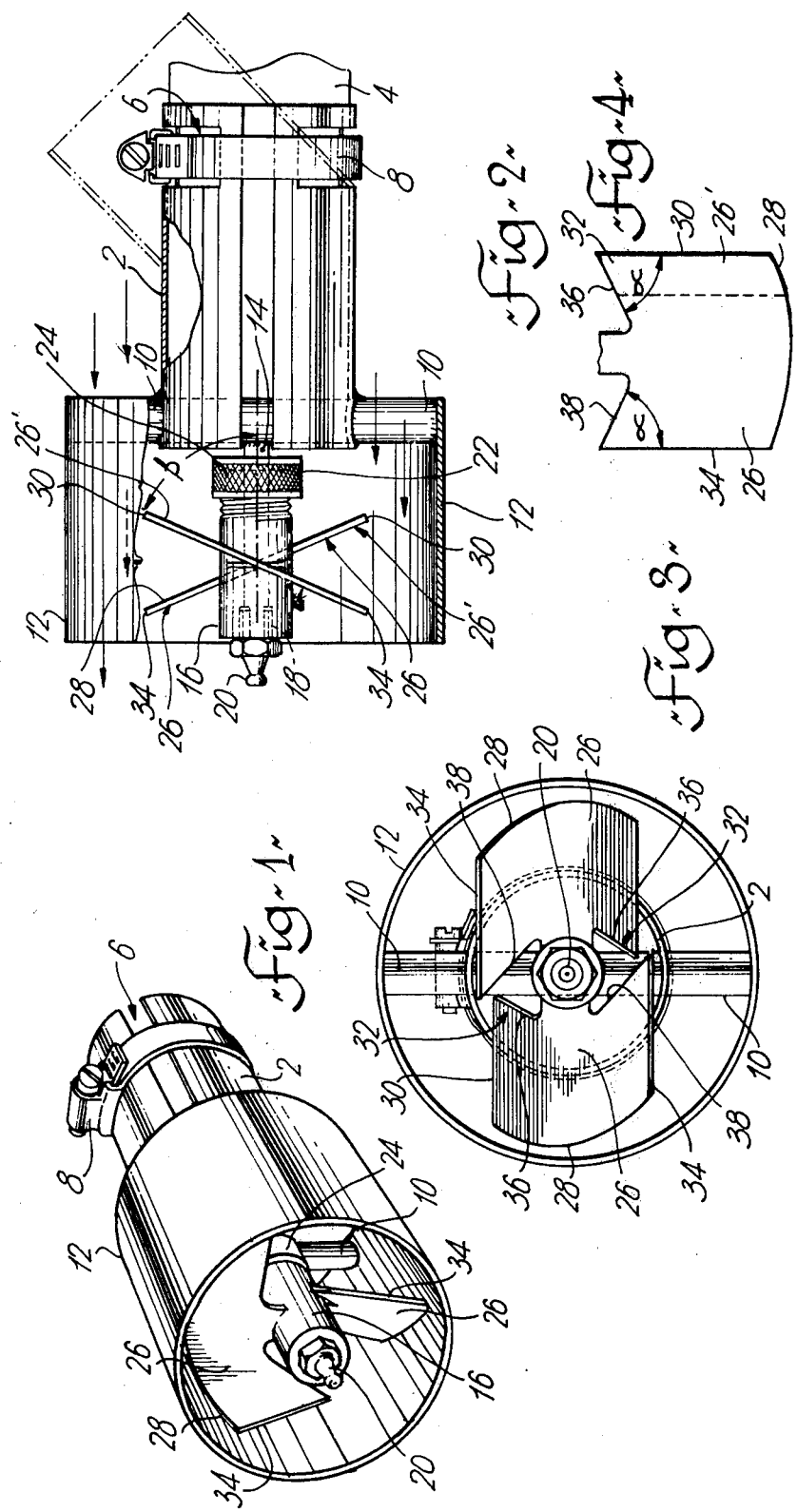

EXHAUST APPARATUS

The present invention relates to a device adapted to be attached to or incorporated into the exhaust assembly of an internal combustion engine for increasing the efficiency of the engine, and particularly relates to improvements over the exhaust apparatus of my earlier British Patent No. 1,351,115, published Apr. 24, 1974.

It is well known that in order to minimize noise emissions from an internal combustion engine, it is necessary to substantially muffle the exhaust gases to reduce the sound to an acceptable degree. This is accomplished by passing the exhaust gases through exhaust tubing and through one or more mufflers to achieve the desired sound reduction. However, it is equally well known that the engine has to work to force all of the hot expanded exhaust gases through the system, and the work expended by the engine to accomplish this considerably reduces engine efficiency and results in inferior performance and decreased gas economy.

The object of the present invention is to provide a device to be incorporated into or secured to the exhaust system of an internal combustion engine to increase the efficiency of the engine.

A further object of the present invention is more specifically to provide a device for securement to or incorporating into the exhaust assembly of an internal combustion engine comprising a generally tubular housing open at both ends to enable passage of exhaust gases and a flow of air therethrough, and an axle coaxially positioned within the housing on a laterally extending support member, and a hub rotatably mounted on the axle, and two identical and opposed radially extending blades secured to the hub, the blades being obliquely angled with respect to the longitudinal axis of the hub, at least the forward edge of each blade extending inwardly providing an inwardly pointed projection.

The apparatus of my British Patent No. 1,351,115 and the device of the present application consists of a generally tubular member adapted for securement to the trailing extremity of the tail or exhaust pipe of an internal combustion engine, and a tubular housing of larger diameter than the said tubular member open at both ends fixedly secured to the tubular member. A shaft or axle is concentrically positioned within the tubular housing and a rotor having a number of blades is rotatably carried thereon. When the apparatus is fixed to the exhaust pipe or tail pipe of a motor vehicle forward movement of the vehicle causes a flow of air through the tubular housing causing the rotor to rotate. This rotation has a suction or extraction effect on the exhaust masses present in the exhaust assembly of the vehicle which results in increased engine performance.

The apparatus is primarily and preferably intended for use in association with motor vehicles and the like which move, with such movement causing rotation of the rotor. However, when the apparatus is fitted to other internal combustion engines which have a laterally extending exhaust or tail pipe, or to a stationary internal combustion engine, suitable means for driving the rotor can be provided by an electrical motor, or air motor, or other suitable means.

The increase in engine performance of the structure described in my earlier British Pat. No. 1,351,115 is very marked as outlined below, with the performance of the improved apparatus according to the present application being still more favourable.

In tests conducted by the Royal Automobile Club of London, England, it was found that an English car having an engine displacement of 1100 c.c. and a curb weight of 1552 pounds increased gasoline mileage performance from 29.34 miles per gallon before fitting of my earlier unit, to 30.27 miles per gallon after fitting of the unit, with other facts remaining constant. The finding of the Royal Automobile Club was an overall fuel consumption decrease of 3.07%; with the mean miles per gallon improvement at an average 35 miles per hour being 2.45%; and the improvement at 65 miles per hour being 5.80%.

In similar tests conducted by the Automobile Association of Cheadle, Cheshire, England, in respect of an English built automobile having a c.c. displacement of 1300, when fitted with my earlier unit showed gas improvement of 2.9 miles per gallon.

In these times of energy conservation and high fuel prices and anti-pollution laws and devices, the above figures represent a significant advance in engine efficiency and decrease in fuel consumption which is of considerable benefit.

While the above figures which represent tests of the apparatus built according to the teachings of my earlier British Patent No. 1,351,115 are significant, the apparatus incorporating the improvement of the present invention provide even more significantly increased efficiency and mileage while reducing costs and energy consumption.

In very recent tests conducted and published by Touring & Travel Magazine of Toronto, it was determined that a Honda Civic over one hundred miles when fitted with the present inventive device increased mileage by 7.2%. Over the one hundred mile course the automobile when fitted obtained exactly 40 m.p.g., whereas the same automobile over the same course obtained only 37.3 m.p.g. without the device.

The present device represents a distinct improvement over the device according to my earlier British Patent No. 1,351,115 in construction and durability, and also as a result of improved configuration and design of the blade members and the degree of orientation of the blades with respect to the longitudinal axis of rotation of the rotor hub. At the time of my earlier British Patent No. 1,351,115 it was considered that to obtain successful and efficient operation, the inner edges of each of the four blades had to be orientated in a linear direction in a plane normal to the longitudinal axis of the rotor hub, but recent investigations have clearly established that the blade configuration according to the present device results in a much improved and more efficient device. Additionally, in earlier British Patent No. 1,351,115 it was considered that the ideal angle of the plane of the blades with respect to the shaft would be approximately 45°, whereas I have now determined that increased efficiency is possible if at least the leading portion of each of the two blades now used be orientated at an angle between 70° amd 75° with respect to the longitudinal axis of the rotor hub. An angle of substantially 72° has been determined to give optimum results.

The inventive concept incorporating the present improvements will now be more specifically described with reference to the accompanying drawings wherein like numerals represent like parts and wherein:

FIG. 1 illustrates the device according to the present invention in perspective view;

FIG. 2 illustrates the device according to FIG. 1 in side partially sectional view;

FIG. 3 shows the device in end view; and

FIG. 4 shows a portion of the blade assembly.

With reference to the accompanying drawings, the device consists of a tubular section or member (which may be cylindrical) adapted for securement to the trailing end of an exhaust or tail pipe 4 leading from an internal combustion engine (not shown). Although various means can be provided for securing the member 2 to the tail pipe, a suitable method is shown wherein the member 2 is provided with opposed slots 6 with attachment means such as a gear clamp 8. An arrangement such as shown in the drawings permits the device to be secured to tail pipes within certain diameter ranges but of course with automobiles having much smaller or much greater diameter tail pipes than average used in this country, suitable other sizes of member 2 can be provided.

The straight tubular member shown in full lines in FIG. 2 is for use with vehicles having tail pipes projecting directly rearwardly. Many automobiles in this country however have tail pipe extremities which were angled, and to provide for full air flow through the tubular housing, an angled member such as shown in broken lines in FIG. 2 can be fitted.

Secured to the trailing end of tubular member 2 is a laterally extending support member 10 the outer ends of which are secured to and carry a tubular housing 2 (which may be cylindrical) which is of larger diameter than the tubular member 2 and which is open at both ends for the flow of air therethrough. The member 2, supporting member 10, and housing 12 are preferably constructed of metallic material, and all three components may be secured together by suitable means such as by welding.

Portions of all of the device may be chromed for appearance and durability.

A longitudinal axle or shaft 14 is secured to supporting member 10 and the shaft extends rearwardly of the shaft and is concentrically positioned within the housing 12. A rotor hub 16 is rotatably mounted on the shaft and is supported for free rotation and long life by means of suitable support means such as needle or pin bearings 18 not all of which are shown in the drawings. A lubricant reservoir cavity may be provided between the rotor hub and the axle to provide suitable lubrication means for long life. In a preferred construction, the rotor is lubricated by means of grease fitting 20 provided on the trailing end of the rotor. The axle 14 is as shown in FIG. 2 in broken lines provided with an annular disc or flange 22, and cap nut 24 is held captive between the supporting member 10 and the disc 22. The rotor hub when mounted is positioned over the rearward end of the shaft and moved forwardly and it will be seen from FIG. 2 that the rotor hub is provided with suitable threading for engagement with complementary threading provided on the interior surface of the cap nut 24. The threading provided on the rotor hub and the cap nut will be in the direction opposite to the direction of rotation of the hub whereby rotation of the rotor hub effectively causes the hub and cap nut to tighten.

Other mounting arrangements using pin bearings and a spring retaining clip (not shown) to hold the rotor hub on the shaft are of course possible and are within the scope of the invention.

The rotor hub 16 carries two rotor blades both of which are identical and are identified by numeral 26 in the attached drawings. The outer edges 28 of the rotor blades are of arcuate configuration to generally conform with the cylindrical inner surface of the housing 12, and at least the forward edges 30 of each blade projects inwardly to provide an inwardly directed pointed projection 32. This specific configuration of at least the leading edge of each blade member has been found to provide maximum efficiency by imparting maximum extraction properties to the exhaust gases emitted from the tail pipe 4. In a preferred construction, both the front 30 and back edges 34 of each of the blades is provided with such an inwardly pointed projection, although efficient operation of the device can be obtained by providing only the inner edges of each blade with such an inwardly pointed projection. The inwardly pointed projection of the trailing edge 34 of each blade is shown by numeral 36. The leading 30 and trailing 34 edges of each blade are parallel or substantially parallel with each other; and it has been determined that an angle of $\alpha$ (FIG. 4) between the leading edge with respect to the forward inner edge 36 of the blade of from 62° to 72° has proved highly efficient. The angular relationship between the trailing edge 34 and the rearward inner edge 38 of each blade is also optimally in the range of about 62° to 72°.

The angle $\alpha$ is preferably selected at about 66° – 67°.

Determination have also proved that maximum efficiency and increased mileage can be obtained by providing at least the leading portion 26' of each blade at an angle $\beta$ of between about 70° to 75° with respect to the longitudinal axis of the rotor hub. This angle $\beta$ is shown in FIG. 2. While it is possible that each blade may be planar in configuration as shown and arranged at the angle $\beta$ with respect to the longitudinal axis of the rotor, the blade could be a non-planar structure having a leading portion or section at an angle $\beta$ with respect to the longitudinal axis of the shaft, with the remaining portion of the blade being planar and assuming a lesser angle with respect to the longitudinal axis of the hub.

In operation and when a vehicle is standing and idling, no rotation of the rotor structure is observed. However, once the vehicle begins moving, the forward movement causes a flow of air (slipstream) through the forward end of the housing 12 in a direction as shown by the arrows in FIG. 2. This flow of air causes rotation of the rotor and attached blades to effect evacuation and partial suction on the exhaust gases within the exhaust assembly as discussed.

As indicated above, the present device can be attached to the trailing end of an exhaust pipe on a vehicle, and as will be appreciated the structure could be integrally formed with a tail pipe assembly for a vehicle if desired.

I claim:

1. Device for securement to or incorporating into the exhaust assembly of an internal combustion engine comprising a generally tubular housing open at both ends to enable passage of exhaust gases and a flow of air therethrough, an axle co-axially positioned within the housing on a laterally extending support member, a hub having a longitudinal axis rotatably mounted on the axle, and solely two, opposed, radially extending blades secured to the hub, the blades being obliquely angled with respect to the longitudinal axis of the hub with at least the forward portion of each blade being angled in a plane in the range of 70° to 75°, the forward and rearward portions of each blade extending inwardly providing pointed projections between the forward edge and the forward inner edge, and the rearward edge and the rearward inner edge of the blade, respectively, the forward edges, and the rearward edges, each defining at said projection an angle in the range of 62° to 72°.

2. Device according to claim 1, wherein the said forward edges, and the said rearward edges each define at said projection an angle of about 66°–67°.

3. Device according to claim 1, including means for securing the device to the exhaust pipe of an internal combustion engine.

4. Device according to claim 1, wherein the hub is mounted on the axle or pin or needle bearings, and the hub is provided with a grease fitting for lubrication.

5. Device according to claim 1 wherein the forward portion of each blade is angled in a plane of about 72° with respect to the longitudinal axis of the hub.

6. Device according to claim 1, wherein the housing is cylindrical and the outer edges of the blades is of arcuate shape corresponding with the degree of curvature of the cylindrical housing.

* * * * *